United States Patent
Nakaoka et al.

(10) Patent No.: US 8,506,022 B2
(45) Date of Patent: Aug. 13, 2013

(54) BRAKE APPARATUS AND METHOD FOR CONTROLLING THE BRAKE APPARATUS

(75) Inventors: Hiroshi Nakaoka, Okazaki (JP); Yoshito Tanaka, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1007 days.

(21) Appl. No.: 12/447,989

(22) PCT Filed: Sep. 3, 2008

(86) PCT No.: PCT/IB2008/002286
§ 371 (c)(1), (2), (4) Date: Apr. 30, 2009

(87) PCT Pub. No.: WO2009/031009
PCT Pub. Date: Mar. 12, 2009

(65) Prior Publication Data
US 2009/0302675 A1 Dec. 10, 2009

(30) Foreign Application Priority Data
Sep. 4, 2007 (JP) .................. 2007-229149

(51) Int. Cl.
*B60T 8/42* (2006.01)
*B60T 8/60* (2006.01)

(52) U.S. Cl.
USPC ..................... 303/115.4; 303/155

(58) Field of Classification Search
USPC .............. 303/20, 155, 113.1–119.3, 154
See application file for complete search history.

(56) References Cited

U.S. PATENT DOCUMENTS

| 5,984,432 A * | 11/1999 | Otomo et al. ............ 303/119.2 |
| 6,347,842 B1 | 2/2002 | Isono |
| 6,412,881 B1 | 7/2002 | Isono |
| 2002/0021044 A1 | 2/2002 | Hara et al. |
| 2005/0225164 A1 | 10/2005 | Obai |
| 2007/0114842 A1 | 5/2007 | Ohkubo et al. |
| 2007/0176486 A1* | 8/2007 | Nakamura ............. 303/115.1 |

FOREIGN PATENT DOCUMENTS

| EP | 1 020 340 | 7/2000 |
| EP | 1 177 960 | 2/2002 |
| EP | 1 816 046 A2 | 8/2007 |
| JP | 10-278764 | 10/1998 |
| JP | 2006 123889 | 5/2006 |
| JP | 2007 137281 | 6/2007 |

OTHER PUBLICATIONS

Japanese Office Action issued Jul. 16, 2009, in the corresponding Japanese Patent Appliction No. 2007-229149 (with Partial English Translation).
Office Action issued Nov. 11, 2010 in German Application No. 11 2008 000 075.1 (With English Translation).

* cited by examiner

*Primary Examiner* — Bradley King
*Assistant Examiner* — Vishal Sahni
(74) *Attorney, Agent, or Firm* — Oblon, Spivak, McClelland, Maier & Neustadt, L.L.P.

(57) ABSTRACT

A brake apparatus includes multiple wheel cylinders; multiple maintaining valves; a pressure-regulating control valve; and a control unit that controls the upstream pressure by switching a pressure-control mode between a pressure-regulating mode which is selected when a deviation of the upstream pressure from a target pressure is outside a setting range and in which the upstream pressure is brought to the target pressure using the pressure-regulating control valve and a pressure-maintaining mode that is selected when the deviation is within the setting range. The control unit opens the pressure-regulating control valve before the pressure-control mode is switched from the pressure-maintaining mode to the pressure-regulating mode.

15 Claims, 3 Drawing Sheets

BRAKE APPARATUS AND METHOD FOR CONTROLLING THE BRAKE APPARATUS

BACKGROUND OF THE INVENTION

1. Field of the Invention

An aspect of the invention relates to a brake apparatus which includes multiple wheel cylinders that apply braking forces to respective multiple cylinders when being supplied with hydraulic fluid; multiple maintaining valves that are arranged upstream of the respective wheel cylinders in order to maintain hydraulic pressures in the respective wheel cylinders; pressure-regulating control valves that are arranged upstream of the multiple maintaining valves in order to control an upstream pressure which is a pressure upstream of the multiple maintaining valves; and a control unit that controls the upstream pressure by switching a pressure-control mode between a pressure-regulating mode which is selected when a deviation of the upstream pressure from a target pressure is outside a setting range and in which the upstream pressure is brought to the target pressure using the pressure-regulating control valve and a pressure-maintaining mode that is selected when the deviation is within the setting range.

2. Description of the Related Art

For example, Japanese Patent Application Publication No. 2006-123889 (JP-A-2006-123889) describes a brake control apparatus that is equipped with so-called brake-by-wire technology. According to the brake-by-wire technology, a brake operation performed by a driver is detected, and a braking force that is required by the driver is generated under electronic control. In the brake control apparatus, paired linear control valves, which are shared by all wheel cylinders, control wheel cylinder pressures in the respective wheel cylinders. In terms of cost performance, providing only one pair of linear control valves is better than providing linear control valves for respective wheel cylinders.

Japanese Patent Application Publication No. 2007-137281 (JP-A-2007-137281) describes a brake control apparatus that executes control by changing a control gain for a linear control valve based on the number of ABS maintaining valves that are open so that fluctuation of the upstream pressure due to opening and closing of the ABS linear maintaining valves is suppressed during ABS control.

When brake assist control is executed to enhance the degree of brake application during a sudden braking operation, ABS control may be executed along with the brake assist control. The reason why the ABS control is executed is that wheel lockup easily occurs because the wheel cylinder pressure is controlled to a relatively high pressure under the brake assist control. The ABS maintaining valves are repeatedly opened and closed under the ABS control, and a volumetric capacity, which is a target of control by the linear control valves, dynamically fluctuates relatively widely. That is, control characteristic of the wheel cylinder upstream pressure, which is the control target hydraulic pressure, fluctuates dynamically. In this case, it is more difficult to bring the wheel cylinder upstream pressure to a target hydraulic pressure than in the case of regular braking control.

SUMMARY OF THE INVENTION

The invention provides a brake control technology according to which a control target hydraulic pressure is smoothly brought to a target hydraulic pressure.

An aspect of the invention relates to a brake apparatus which includes multiple wheel cylinders that apply braking forces to respective multiple cylinders when being supplied with hydraulic fluid; multiple maintaining valves that are arranged upstream of the respective wheel cylinders in order to maintain hydraulic pressures in the respective wheel cylinders; pressure-regulating control valves that are +arranged upstream of the multiple maintaining valves in order to control an upstream pressure which is a pressure upstream of the multiple maintaining valves; and a control unit that controls the upstream pressure by switching a pressure-control mode between a pressure-regulating mode which is selected when a deviation of the upstream pressure from a target pressure is outside a setting range and in which the upstream pressure is brought to the target pressure using the pressure-regulating control valve and a pressure-maintaining mode that is selected when the deviation is within the setting range.

The control unit controls a valve opening pressure for opening the pressure-regulating control valve in the pressure-maintaining mode so that the pressure-regulating control valve is opened due to a differential pressure before the pressure-control mode is switched from the pressure-maintaining mode to the pressure-regulating mode.

According to the aspect of the invention described above, in the pressure-regulating mode, the control unit controls at least one of the paired pressure-regulating control valves so that the wheel cylinder upstream pressure is brought to the target pressure when the deviation of the wheel cylinder upstream pressure from the target pressure is outside the setting range. When the deviation is within the setting range, the control unit selects the pressure-maintaining mode. The valve opening pressure for opening the pressure-regulating control valve in the pressure-maintaining mode is controlled so that the pressure-regulating valve is opened due to the differential pressure before the pressure-control mode is switched from the pressure-maintaining mode to the pressure-regulating mode. Therefore, when the deviation increases, the pressure-regulating control valve is opened before the pressure-control mode is switched. As a result, the deviation is reduced. If the differential pressure is maintained within the setting range due to the mechanical opening of the pressure-regulating valve, the pressure-control mode need not be switched to the pressure-regulating mode. Causing the control valve to substantially function as a differential pressure regulating valve makes it possible to flexibly deal with fluctuation in the control characteristic, for example, the control target volumetric capacity, thereby smoothly bringing the control target hydraulic pressure to the target pressure. Also, it is possible to suppress an increase in a control load that is placed on the pressure-regulating control valve.

In the aspect of the invention described above, the control unit may control the braking forces by selecting one of multiple brake modes that include a regular brake mode in which all the maintaining valves are kept open so that the upstream pressure is supplied to the wheel cylinders and a special brake mode in which at least one of the maintaining valves is repeatedly opened and closed. When the special brake mode is selected, the valve opening pressure may be controlled in the pressure-maintaining mode in such a manner that the pressure-regulating control valve is opened when the upstream pressure is not within a permissible range that is included in the setting range and that includes the target pressure.

With this configuration, in the special brake mode in which the maintaining valves are repeatedly opened and closed, the hydraulic pressure is regulated using also mechanical opening and closing of the pressure-regulating control valve. Repeatedly opening and closing the maintaining valves causes relatively great dynamic fluctuation in the control target volumetric capacity. Causing the pressure-regulating control valve to function as a differential pressure regulating valve alleviates the unfavorable effects of opening and closing of the maintaining valves, which improves the smoothness with which the control target hydraulic pressure is brought to the target hydraulic pressure.

In the aspect of the invention described above, the pressure-regulating control valves may include a pressure-increasing control valve that is used to increase the upstream pressure and a pressure-decreasing control valve that is used to decrease the upstream pressure. The control unit may control a valve opening pressure for opening the pressure-increasing control valve and a valve opening pressure for opening the pressure-decreasing control valve in such a manner that the pressure-increasing control valve is opened when the upstream pressure falls below the target pressure and the pressure-decreasing control valve is opened when the upstream pressure exceeds a reference pressure that is set to a value which is higher than the target pressure by a predetermined amount.

With this configuration, the pressure-increasing control valve or the pressure-decreasing control valve is opened when the upstream pressure is outside the permissible range that is set based on the target pressure and the reference pressure that is higher than the target pressure. As a result, the wheel cylinder upstream pressure is smoothly brought into the permissible range.

In the first aspect of the invention, the pressure-decreasing control valve may be an electromagnetically-controlled valve of which the valve opening pressure fluctuates in accordance with an electric current that is supplied to the pressure-decreasing control valve; the pressure-increasing control valve may be an electromagnetically-controlled valve of which the valve opening pressure fluctuates in accordance with an electric current that is supplied to the pressure-increasing control valve; and the control unit may control the valve opening pressure for opening the pressure-decreasing control valve by executing feedforward control over the electric current that is supplied to the pressure-decreasing control valve, or the valve opening pressure for opening the pressure-increasing control valve by executing feedforward control over the electric current that is supplied to the pressure-increasing control valve.

With this configuration, it is possible to cause the pressure-decreasing control valve and the pressure-increasing control valve to substantially function as differential pressure regulating valves by executing the feedforward control. Therefore, control loads that are placed on the pressure-decreasing control valve and the pressure-increasing control valve are reduced.

In the aspect of the invention described above, the pressure-regulating control valves may include the pressure-increasing control valve that is used to increase the upstream pressure; and the control unit may control the valve opening pressure for opening the pressure-increasing control valve in such a manner that the pressure-increasing control valve is opened when the upstream pressure falls below the target pressure in the pressure-regulating mode.

With this configuration, it is possible to compensate for an unnecessary decrease in the upstream pressure in the pressure-regulating mode using mechanical opening/closing of the pressure-increasing control valve.

According to the aspect of the invention described above, it is possible to bring the control target hydraulic pressure to the target pressure more smoothly.

BRIEF DESCRIPTION OF THE DRAWINGS

The foregoing and further features and advantages of the invention will become apparent from the following description of an example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described in detail with reference to the accompanying drawings.

Figure 1:
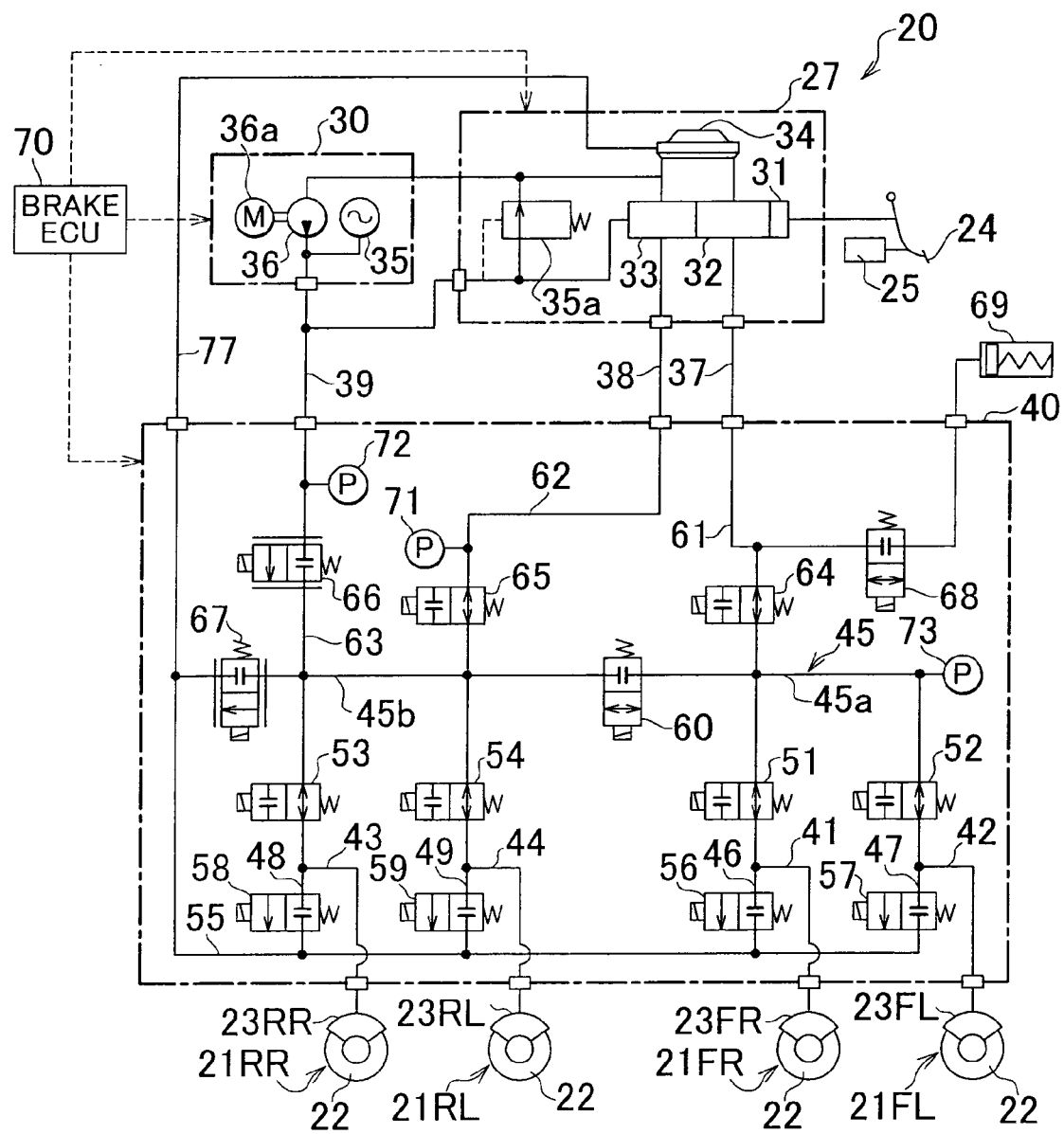
FIG. 1 is a system diagram showing a brake apparatus according to an embodiment of the invention.

FIG. 1 is a system diagram showing a brake apparatus 20 according to an embodiment of the invention. The brake apparatus 20 shown in FIG. 1 forms an electronically-controlled brake system (ECB) for a vehicle, and controls braking forces that are applied to four wheels of the vehicle. The brake apparatus 20 according to the embodiment of the invention is mounted in, for example, a hybrid vehicle provided with an electric motor and an internal combustion engine that serve as drive power sources. In a hybrid vehicle, braking force may be applied to the vehicle through a regenerative braking operation in which kinetic energy of the vehicle is converted into electric energy and stored or a hydraulic pressure braking operation executed by the brake apparatus 20. In the vehicle in the embodiment of the invention, it is also possible to execute cooperative braking control to generate desired braking force through combined execution of the regenerative braking operation and the hydraulic pressure braking operation.

As shown in FIG. 1, the brake apparatus 20 includes disc brake units 21FR, 21FL, 21RR and 21RL that are fitted to respective four wheels, a master cylinder unit 27, a power hydraulic pressure source 30, and a hydraulic actuator 40.

The disc brake units 21FR, 21FL, 21RR and 21RL apply braking forces to a right front wheel, a left front wheel, a right rear wheel and a left rear wheel of the vehicle, respectively. The master cylinder unit 27, which serves as a manual hydraulic pressure source, delivers brake fluid pressurized in accordance with the operation amount of a brake pedal 24 that serves as a brake operating member to the disc brake units 21FR, 21FL, 21RR and 21RL. The power hydraulic pressure source 30 delivers the brake fluid, used as the hydraulic fluid and pressurized by supplied drive power, to the disc brake units 21FR, 21FL, 21RR and 21RL independently of any operations of the brake pedal 24. The hydraulic actuator 40 adjusts, on an as-required basis, the hydraulic pressure of the brake fluid supplied from the power hydraulic pressure source 30 or the master cylinder unit 27, and then delivers the brake fluid to the disc brake units 21FR, 21FL, 21RR and 21RL. Thus, the braking forces that are applied to the respective wheels through the hydraulic pressure braking operation are adjusted.

The disc brake units 21FR, 21FL, 21RR and 21RL, the master cylinder unit 27, the power hydraulic pressure source 30, and the hydraulic actuator 40 will be described below in more detail. The disc brake units 21FR, 21FL, 21RR and 21RL include brake discs 22, and wheel cylinders 23FR, 23FL, 23RR and 23RL incorporated in brake calipers, respectively. The wheel cylinders 23FR to 23RL are connected to the hydraulic actuator 40 via respective fluid passages. Hereinafter, the wheel cylinders 23FR to 23RL will be collectively referred to as the "wheel cylinders 23", where appropriate.

In the disc brake units 21FR, 21FL, 21RR and 21RL, when the brake fluid is supplied from the hydraulic actuator 40 to the wheel cylinders 23, brake pads that serve as friction members are pushed against the brake discs 22 that rotate together with the wheels. Thus, braking force is applied to each wheel. In the embodiment of the invention, the disc brake units 21FR to 21RL are used. Alternatively, other braking force applying mechanisms including wheel cylinders, for example, drum brake units may be used.

In the embodiment of the invention, the master cylinder unit 27 is provided with a hydraulic pressure booster. The master cylinder unit 27 includes a hydraulic pressure booster 31, a master cylinder 32, a regulator 33, and a reservoir 34. The hydraulic pressure booster 31 is connected to the brake pedal 24. The hydraulic pressure booster 31 amplifies the pedal depression force applied to the brake pedal 24, and then transfers the amplified pedal depression force to the master cylinders 32. Thus, the hydraulic fluid is pressurized. The pedal depression force is amplified by supplying the brake fluid from the power hydraulic pressure source 30 to the hydraulic pressure booster 31 through the regulator 33. Then, the master cylinder 32 generates master cylinder pressure corresponding to a value obtained by amplifying the pedal depression force by predetermined number of times.

The reservoir 34 that stores the brake fluid is provided above the master cylinder 32 and the regulator 33. The master cylinder 32 communicates with the reservoir 34 when the brake pedal 24 is not depressed. The regulator 33 communicates with both the reservoir 34 and an accumulator 35 of the power hydraulic pressure source 30. The regulator 33 generates a fluid pressure that is substantially equal to the master cylinder pressure using the reservoir 34 as a low-pressure source and the accumulator 35 as a high-pressure source. Hereinafter, the hydraulic pressure in the regulator 33 will be referred to as the "regulator pressure" where appropriate. Note that, the master cylinder pressure and the regulator pressure need not be exactly equal to each other. For example, the master cylinder unit 27 may be designed in such a manner that the regulator pressure is slightly higher than the master cylinder pressure.

The power hydraulic pressure source 30 includes the accumulator 35 and a pump 36. The accumulator 35 converts the pressure energy of the brake fluid pressurized by the pump 36 into the pressure energy of the filler gas such as nitrogen, for example, the pressure energy having a pressure of approximately 14 MPa to approximately 22 MPa, and stores the pressure energy. The pump 36 has a motor 36a that serves as a drive power source. An inlet of the pump 36 is connected to the reservoir 34, and an outlet thereof is connected to the accumulator 35. The accumulator 35 is connected also to a relief valve 35a provided in the master cylinder unit 27. When the pressure of the brake fluid in the accumulator 35 abnormally increases and becomes, for example, approximately 25 MPa, the relief valve 35a opens, and the brake fluid having a high pressure is returned to the reservoir 34.

As described above, the brake apparatus 20 includes the master cylinder 32, the regulator 33, and the accumulator 35 that serve as brake fluid supply sources from which the brake fluid is supplied to the wheel cylinders 23. A master pipe 37 is connected to the master cylinder 32. A regulator pipe 38 is connected to the regulator 33. An accumulator pipe 39 is connected to the accumulator 35. The master pipe 37, the regulator pipe 38 and the accumulator pipe 39 are connected to the hydraulic actuator 40.

The hydraulic actuator 40 includes an actuator block having a plurality of passages formed therein, and a plurality of electromagnetically-controlled valves. Examples of the passages formed in the actuator block include individual passages 41, 42, 43 and 44 and a main passage 45. The individual passages 41, 42, 43 and 44 branch off from the main passage 45, and are connected to the wheel cylinders 23FR, 23FL, 23RR and 23RL of the disc brake units 21FR, 21FL, 21RR and 21RL, respectively. Thus, communication is provided between the wheel cylinders 23 and the main passage 45.

ABS maintaining valves 51, 52, 53 and 54 are provided at the middle portions of the individual passages 41, 42, 43 and 44, respectively. Each of the ABS maintaining valves 51, 52, 53 and 54 includes a solenoid subjected to the ON/OFF control and a spring, and is a normally-open electromagnetically-controlled valve that is open when electric power is not supplied to the solenoid. Each of the ABS maintaining valves 51 to 54 allows the brake fluid to flow in either direction, when it is open. Namely, each of the ABS maintaining valves 51 to 54 allows the brake fluid to flow from the main passage 45 to the wheel cylinders 23, and also allows the brake fluid to flow from the wheel cylinders 23 to the main passage 45. When electric power is supplied to the solenoids and the ABS maintaining valves 51 to 54 are closed, the flow of the brake fluid through the individual passages 41 to 44 is shut off.

In addition, the wheel cylinders 23 are connected to a reservoir passage 55 via pressure-decreasing passages 46, 47, 48 and 49 connected to the individual passages 41, 42, 43 and 44, respectively. ABS pressure-decreasing valves 56, 57, 58 and 59 are provided at the middle portions of the pressure-decreasing passages 46, 47, 48 and 49, respectively. Each of the ABS pressure-decreasing valves 56 to 59 includes a solenoid subjected to the ON/OFF control and a spring, and is a normally-closed electromagnetically-controlled valve that is closed when electric power is not supplied to the solenoid. When the ABS pressure-decreasing valves 56 to 59 are closed, the flow of the brake fluid through the pressure-decreasing passages 46 to 49 is shut off. When electric power is supplied to the solenoids and the ABS pressure-decreasing valves 56 to 59 are opened, the brake fluid flows through the pressure-decreasing passages 46 to 49, and the brake fluid is returned from the wheel cylinders 23 to the reservoir 34 through the pressure-decreasing passages 46 to 49 and the reservoir passage 55. The reservoir passage 55 is connected to the reservoir 34 of the master cylinder unit 27 via a reservoir pipe 77.

A partition valve 60 is provided at the middle portion of the main passage 45. The main passage 45 is partitioned into a first passage 45a that is connected to the individual passages 41 and 42, and a second passage 45b that is connected to the individual passages 43 and 44, when the partition valve 60 is closed. The first passage 45a is connected to the wheel cylinders 23FR and the 23FL for the front wheels via the individual passages 41 and 42, respectively. The second passage 45b is connected to the wheel cylinders 23RR and 23RL for the rear wheels via the individual passages 43 and 44, respectively.

The partition valve 60 includes a solenoid subjected to the ON/OFF control and a spring, and is a normally-closed electromagnetically-controlled valve that is closed when electric power is not supplied to the solenoid. When the partition valve 60 is closed, the flow of the brake fluid through the main passage 45 is shut off. When electric power is supplied to the solenoid and the partition valve 60 is opened, the brake fluid flows between the first passage 45a and the second passage 45b in either direction.

In the hydraulic actuator 40, a master passage 61 and a regulator passage 62, which communicate with the main passage 45, are formed. More specifically, the master passage 61 is connected to the first passage 45a of the main passage 45, and the regulator passage 62 is connected to the second passage 45b of the main passage 45. The master passage 61 is connected to the master pipe 37 that communicates with the master cylinder 32. The regulator passage 62 is connected to the regulator pipe 38 that communicates with the regulator 33.

A master cut valve 64 is provided at the middle portion of the master passage 61. The master cut valve 64 is provided on a path through which the brake fluid is supplied from the master cylinder 32 to each wheel cylinder 23. The master cut valve 64 includes a solenoid subjected to the ON/OFF control and a spring, and is a normally-open electromagnetically-controlled valve that is reliably closed by an electromagnetic force which is generated by the solenoid upon reception of a prescribed control current and that is open when electric power is not supplied to the solenoid. When the master cut valve 64 is open, the brake fluid flows between the master cylinder 32 and the first passage 45a of the main passage 45 in either direction. When the prescribed control current is supplied to the solenoid and the master cut valve 64 is closed, the flow of the brake fluid through the master passage 61 is shut off.

A stroke simulator 69 is connected to the master passage 61 via a simulator cut valve 68, at a position upstream of the master cut valve 64. Namely, the simulator cut valve 68 is provided on the passage that connects the master cylinder 32 to the stroke simulator 69. The simulator cut valve 68 includes a solenoid subjected to the ON/OFF control and a spring, and is a normally-closed electromagnetically-controlled valve that is reliably open due to an electromagnetic force which is generated by the solenoid upon reception of a prescribed control current and that is closed when electric power is not supplied to the solenoid. When the simulator cut valve 68 is closed, the flow of the brake fluid through the master passage 61 between the simulator cut valve 68 and the stroke simulator 69 is shut off. When electric power is supplied to the solenoid and the simulator cut valve 68 is opened, the brake fluid flows between the master cylinder 32 and the stroke simulator 69 in either direction.

The stroke simulator 69 includes a plurality of pistons and a plurality of springs. When the simulator cut valve 68 is opened, the stroke simulator 69 generates a reaction force corresponding to the depression force applied to the brake pedal 24 by a driver. Preferably, a stroke simulator that has multi-stage spring characteristics is used as the stroke simulator 69 in order to improve the brake pedal operating feel felt by the driver.

A regulator cut valve 65 is provided at the middle portion of the regulator passage 62. The regulator cut valve 65 is provided on a path through which the brake fluid is supplied from the regulator 33 to each wheel cylinder 23. The regulator cut valve 65 also includes a solenoid subjected to the ON/OFF control and a spring, and is a normally-open electromagnetically-controlled valve that is reliably closed by an electromagnetic force which is generated by the solenoid upon reception of a prescribed control current and that is open when electric power is not supplied to the solenoid. When the regulator cut valve 65 is open, the brake fluid flows between the regulator 33 and the second passage 45b of the main passage 45 in either direction. When electric power is supplied to the solenoid and the regulator cut valve 65 is closed, the flow of the brake fluid through the regulator passage 62 is shut off.

In addition to the master passage 61 and the regulator passage 62, an accumulator passage 63 is formed in the hydraulic actuator 40. One end of the accumulator passage 63 is connected to the second passage 45b of the main passage 45, and the other end thereof is connected to the accumulator pipe 39 that communicates with the accumulator 35.

A pressure-increasing linear control valve 66 is provided at the middle portion of the accumulator passage 63. The accumulator passage 63 and the second passage 45b of the main passage 45 are connected to the reservoir passage 55 via a pressure-decreasing linear control valve 67. Each of the pressure-increasing linear control valve 66 and the pressure-decreasing linear control valve 67 has a linear solenoid and a spring, and is a normally-closed electromagnetically-controlled valve that is closed when electric power is not supplied to the linear solenoid. The opening amounts of the pressure-increasing linear control valve 66 and the pressure-decreasing linear control valve 67 are adjusted in proportion to the magnitudes of electric currents supplied to the respective linear solenoids.

The pressure-increasing linear control valve 66 is shared by the multiple wheel cylinders 23 corresponding to the respective wheels. Similarly, the pressure-decreasing linear control valve 67 is shared by the multiple wheel cylinders 23. Namely, according to the embodiment of the invention, the pressure-increasing linear control valve 66 and the pressure-decreasing linear control valve 67 are provided as a pair of control valves that are shared by the wheel cylinders 23 and that control the hydraulic fluid supplied from the power hydraulic pressure source 30 to the wheel cylinders 23 and the hydraulic fluid returned from the wheel cylinders 23 to the power hydraulic pressure source 30. In terms of cost performance, providing one pressure-increasing linear control valve 66 that is shared by the multiple wheel cylinders 23 is better than providing linear control valves for the respective wheel cylinders 23.

The pressure difference between an inlet and an outlet of the pressure-increasing linear control valve 66 corresponds to the difference between the pressure of the brake fluid in the accumulator 35 and the pressure of the brake fluid in the main passage 45. The pressure difference between an inlet and an outlet of the pressure-decreasing linear control valve 67 corresponds to the difference between the pressure of the brake fluid in the main passage 45 and the pressure of the brake fluid in the reservoir 34. When the electromagnetic drive power corresponding to the electric power supplied to the linear solenoid of each of the pressure-increasing linear control valve 66 and the pressure-decreasing linear control valve 67 is F1, the biasing force of the spring of each of the pressure-increasing linear control valve 66 and the pressure-decreasing linear control valve 67 is F2, and the differential pressure acting force corresponding to the pressure difference between the inlet and the outlet of each of the pressure-increasing linear control valve 66 and the pressure-decreasing linear control valve 67 is F3, the equation, F1+F3=F2, is satisfied. Accordingly, the pressure difference between the inlet and the outlet of each of the pressure-increasing linear control valve 66 and the pressure-decreasing linear control valve 67 is controlled by continuously controlling the electric power supplied to the linear solenoid of each of the pressure-increasing linear control valve 66 and the pressure-decreasing linear control valve 67.

In the brake apparatus 20, the power hydraulic pressure source 30 and the hydraulic actuator 40 are controlled by a brake ECU 70 that serves as a controller according to the embodiment of the invention. The brake ECU 70 is formed of a microprocessor including a CPU. The brake ECU 70 includes, in addition to the CPU, a ROM that stores various programs, a RAM that temporarily stores data, an input port, an output port, a communication port, etc. The brake ECU 70 communicates with a hybrid ECU (not shown), etc. at a higher level. The brake ECU 70 controls the pump 36 of the power hydraulic pressure source 30, the electromagnetically-controlled valves 51 to 54, 56 to 59, 60, and 64 to 68 that form the hydraulic actuator 40 based on the control signals from the hybrid ECU and the signals from various sensors.

A regulator pressure sensor 71, an accumulator pressure sensor 72, and a control pressure sensor 73 are connected to the brake ECU 70. The regulator pressure sensor 71 is provided upstream of the regulator cut valve 65. The regulator pressure sensor 71 detects the pressure of the brake fluid in the regulator passage 62, namely, the regulator pressure, and transmits a signal indicating the detected regulator pressure to the brake ECU 70. The accumulator pressure sensor 72 is provided upstream of the pressure-increasing linear control valve 66. The accumulator pressure sensor 72 detects the pressure of the brake fluid in the accumulator passage 63, namely, the accumulator pressure, and transmits a signal indicating the detected accumulator pressure to the brake ECU 70. The control pressure sensor 73 detects the pressure of the brake fluid in the first passage 45a of the main passage 45, and transmits a signal indicating the detected brake fluid pressure to the brake ECU 70. The signals indicating the values detected by the regulator pressure sensor 71, the accumulator pressure sensor 72, and the control pressure sensor 73 are transmitted to the braked ECU 70 at predetermined time intervals, and stored in a predetermined storage region of the brake ECU 70.

When the partition valve 60 is open and the first passage 45a and the second passage 45b of the main passage 45 communicate with each other, the value output from the control pressure sensor 73 indicates the lower hydraulic pressure at the pressure-increasing linear control valve 66 and the higher hydraulic pressure at the pressure-decreasing linear control valve 67. Accordingly, the value output from the control pressure sensor 73 is used to control the pressure-increasing linear control valve 66 and the pressure-decreasing linear control valve 67. When the pressure-increasing linear control valve 66 and the pressure-decreasing linear control valve 67 are both closed and the master cut valve 64 is open, the value output from the control pressure sensor 73 indicates the master cylinder pressure. When the partition valve 60 is open and the first passage 45a and the second passage 45b of the main passage 45 communicate with each other, and the ABS maintaining valves 51 to 54 are open while the ABS pressure-decreasing valves 56 to 59 are closed, the value output from the control pressure sensor 73 indicates the hydraulic fluid pressure that is applied to each of the wheel cylinders 23, namely, the wheel cylinder pressure.

Examples of the sensors that are connected to the brake ECU 70 include a stroke sensor 25 fitted to the brake pedal 24. The stroke sensor 25 detects a brake pedal stroke that is an operation amount of the brake pedal 24, and transmits a signal indicating the detected brake pedal stroke to the brake ECU 70. The value output from the stroke sensor 25 is transmitted to the brake ECU 70 at predetermined time intervals, and stored in a predetermined storage region of the brake ECU 70. Brake operation state detection means other than the stroke sensor 25 may be provided in addition to or instead of the stroke sensor 25 and may be connected to the brake ECU 70. Examples of the brake operation state detection means include a pedal depression force sensor that detects an operation force applied to the brake pedal 24 and a brake switch that detects depression of the brake pedal 24.

The thus structured brake apparatus 20 executes the cooperative braking control. The brake apparatus 20 starts braking control upon reception of a braking command. A braking command is issued when brakes should be applied to the vehicle, for example, when the driver operates the brake pedal 24. The brake ECU 70 calculates a required braking force upon reception of the braking command, and calculates a required hydraulic braking force, which is a hydraulic braking force that should be generated by the brake apparatus 20, by subtracting a regenerative braking force from the required braking force. A signal indicating the regenerative braking force is transmitted from the hybrid ECU to the brake apparatus 20. The brake ECU 70 calculates target hydraulic pressures for the wheel cylinders 23FR to 23RL based on the calculated required hydraulic braking force. The brake ECU 70 determines values of control currents that are supplied to the pressure-increasing linear control valve 66 and the pressure-decreasing linear control valve 67 by executing feedback control in such a manner that the wheel cylinder pressures match the respective target hydraulic pressures.

As a result, in the brake apparatus 20, the brake fluid is supplied from the power hydraulic pressure source 30 to each wheel cylinder 23 via the pressure-increasing linear control valve 66, whereby braking forces are applied to the wheels. Also, the brake fluid is returned from each wheel cylinder 23 to the power hydraulic pressure source 30 via the pressure-decreasing linear control valve 67, whereby the braking forces that are applied to the wheels are adjusted. In the embodiment of the invention, the power hydraulic pressure source 30, the pressure-increasing linear control valve 66, the pressure-decreasing linear control valve 67, etc. constitute a wheel cylinder pressure control system. The wheel cylinder pressure control system executes so-called brake-by-wire braking force control. The wheel cylinder pressure control system is arranged in parallel with the path through which the brake fluid is supplied from the master cylinder unit 27 to the wheel cylinders 23.

More specifically, the brake ECU 70 selects one of three control classes based on the deviation of the actual hydraulic pressure from the target hydraulic pressure, and controls the hydraulic pressure in the main passage 45, that is, the pressure upstream of the maintaining valves (hereinafter, referred to as "maintaining valve upstream pressure"). The brake ECU 70 controls the maintaining valve upstream pressure by controlling the pressure-increasing linear control valve 66 and the pressure-decreasing linear control valve 67. A pressure-increasing mode, a pressure-decreasing mode, and a pressure-maintaining mode are set as the three control classes. The brake ECU 70 selects the pressure-increasing mode when the deviation exceeds a pressure-increase required threshold value, selects the pressure-decreasing mode when the deviation exceeds a pressure-decrease required threshold value, and selects the pressure-maintaining mode when the deviation is between the pressure-increase required threshold value and the pressure-decrease required threshold value, that is, when the deviation is within a setting range. The deviation is calculated, for example, by subtracting the actual hydraulic pressure from the target hydraulic pressure. As the actual hydraulic pressure, for example, a value measured by the control pressure sensor 73 is used. As the target hydraulic pressure, for example, a target value for the maintaining valve upstream pressure, that is, the hydraulic pressure in the main passage 45 is used.

In the embodiment of the invention, when the pressure-increasing mode is selected, the brake ECU 70 supplies a feedback current that corresponds to the deviation to the pressure-increasing linear control valve 66. When the pressure-decreasing mode is selected, the brake ECU 70 supplies a feedback current that corresponds to the deviation to the pressure-decreasing linear control valve 67. When the pressure-maintaining mode is selected, the brake ECU 70 supplies an electric current to neither the pressure-increasing linear control valve 66 nor the pressure-decreasing linear control valve 67, according to the embodiment of the invention. That is, the wheel cylinder pressure is increased using the pressure-increasing linear control valve 66 in the pressure-increasing mode, and the wheel cylinder pressure is decreased using the pressure-decreasing linear control valve 67 in the pressure-decreasing mode. In the pressure-maintaining mode, the wheel cylinder pressure is maintained. Hereinafter, the pressure-increasing mode and the pressure-decreasing mode will be collectively referred to as "pressure-regulating modes", and the pressure-increasing linear control valve 66 and the pressure-decreasing linear control valve 67 will be collectively referred to as "pressure-regulating valves", where appropriate.

When brake-by-wire braking force control is executed, the brake ECU 70 keeps the regulator cut valve 65 closed so that the brake fluid that is delivered from the regulator 33 is not supplied to the wheel cylinders 23. In addition, the brake ECU 70 keeps the master cut valve 64 closed and keeps the simulator cut valve 68 open. Thus, the brake fluid, which is delivered from the master cylinder 32 in response to an operation of the brake pedal 24 performed by the driver, is supplied not to the wheel cylinders 23 but to the stroke simulator 69. During the cooperative braking control, a differential pressure that corresponds to the magnitude of a regenerative braking force is applied to a portion between the upstream side and the downstream side of each of the regulator cut valve 65 and the master cut valve 64.

In the brake apparatus 20 according to the embodiment of the invention, when the required braking force is covered only by the hydraulic braking force without using the regenerative braking force, the braking force is controlled by the wheel cylinder pressure control system as a matter of course. Hereinafter, the control mode in which the braking force is controlled by the wheel cylinder pressure control system regardless of whether the cooperative braking control is executed will be referred to as "linear control mode" where appropriate. This control mode will be sometimes referred to as brake-by-wire control mode.

When the required braking force is covered only by the hydraulic braking force in the linear control mode, the brake ECU 70 controls the regulator pressure or the master cylinder pressure as the target pressure for the wheel cylinder pressure. In this case, therefore, the brake fluid need not be supplied to the wheel cylinders 23 by the wheel cylinder pressure control system. This is because the required braking force is achieved by just introducing the master cylinder pressure or the regulator pressure that has been boosted in accordance with an operation of the brake pedal performed by the driver into the wheel cylinders 23.

Therefore, in the brake apparatus 20, the brake fluid may be supplied from the regulator 33 to the wheel cylinders 23 when the regenerative braking force is not used, for example, when the vehicle is at a standstill. Hereinafter, the control mode in which the brake fluid is supplied from the regulator 33 to the wheel cylinders 23 will be referred to as "regulator mode". That is, the brake ECU 70 may switch the control mode from the linear control mode to the regulator mode while the vehicle is at a standstill and generate a braking force. Preferably, the control mode is switched at the same time that the vehicle is stopped because the control mode is switched under a relatively simple control. More specifically, the brake ECU 70 may switch the control mode from the linear control mode to the regulator mode, when stopping the regenerative braking control because the vehicle speed has been sufficiently reduced due to the braking operation.

In the regulator mode, the brake ECU 70 keeps the regulator cut valve 65 and the partition valve 60 open and keeps the master cut valve 64 closed. Controls over the pressure-increasing linear control valve 66 and the pressure-decreasing linear control valve 67 are stopped and these linear control valves 66 and 67 are closed. The simulator cut valve 68 is kept open. As a result, the brake fluid is supplied from the regulator 33 to the wheel cylinders 23, whereby braking forces are applied to the wheels by the regulator pressure. The power hydraulic pressure source 30 is connected, as a high-pressure source, to the regulator 33. Therefore, a braking force can be generated using the pressure accumulated in the power hydraulic pressure source 30.

In the regulator mode, as described above, the brake ECU 70 closes the pressure-increasing linear control valve 66 and the pressure-decreasing linear control valve 67 by shutting of supply of control currents to these linear control valves 66 and 67, whereby these linear control valves 66 and 67 are placed in the non-operating state. Therefore, it is possible to reduce the frequency at which the pressure-increasing linear control valve 66 and the pressure-decreasing linear control valve 67 are operated, which makes it possible to use these linear control valves 66 and 67 for a prolonged period. That is, the service lives of the pressure-increasing linear control valve 66 and the pressure-decreasing linear control valve 67 are prolonged.

During the control in the linear control mode, the wheel cylinder pressure may deviate from the target hydraulic pressure due to occurrence of a malfunction such as leakage of the hydraulic fluid from somewhere. The brake ECU 70 periodically determines whether there is an abnormal condition in the response of the wheel cylinder pressure to the control based on, for example, the value measured by the control pressure sensor 73. The brake ECU 70 determines that there is an abnormal condition in the response of the wheel cylinder pressure to the control, for example, when the deviation of the measured value of the wheel cylinder pressure from the target hydraulic pressure exceeds a reference value. If it is determined that there is an abnormal condition in the response of the wheel cylinder pressure to the control, the brake ECU 70 stops the linear control mode and switches the control mode to the manual brake mode. In the regulator mode as well, the brake ECU 70 switches the control mode to the manual brake mode if it is determined that there is an abnormal condition in the response of the wheel cylinder pressure to the control. In the manual brake mode, a depressing force that is applied to the brake pedal 24 by the driver is converted into a hydraulic pressure, and mechanically transferred to the wheel cylinders 23, whereby braking forces are applied to the wheels. The manual brake mode is used as a back-up control mode for the linear control mode in order to ensure fail-safe protection.

The brake ECU 70 selects one of the multiple modes that are used as the manual brake modes by changing the hydraulic pressure source and the hydraulic fluid supply path that extends from the hydraulic pressure source to the wheel cylinders 23. In the embodiment of the invention, switching the control mode to the hydro-booster mode will be described as an example. In the hydro-booster mode, the brake ECU 70 stops supply of control currents to all the electromagnetically-controlled valves. Therefore, the normally-open master cut valve 64 and regulator cut valve 65 are opened, and the normally-closed partition valve 60 and simulator cut valve 68 are closed. Controls over the pressure-increasing linear control valve 66 and the pressure-decreasing linear control valve 67 are stopped, and these linear control valves 66 and 67 are closed.

As a result, the brake fluid supply path is partitioned into two systems, that is, a master cylinder-side system and a regulator-side system. The master cylinder pressure is transferred to the wheel cylinders 23FR and 23FL for the front wheels, and the regulator pressure is transferred to the wheel cylinders 23RR and 23RL for the rear wheels. The destination of the hydraulic fluid delivered from the master cylinder 32 is switched from the stroke simulator 69 to the wheel cylinders 23FR and 23FL for the front wheels. The hydraulic pressure booster 31 is a mechanism that mechanically amplifies the pedal depressing force. Therefore, even if the control mode is switched to the hydro-booster mode and supply of control currents to the electromagnetically-controlled valves is stopped, the hydraulic pressure booster 31 continuously operates. In the hydro-booster mode, even if electric power is not supplied to the electromagnetically-controlled valves due to a malfunction in the control system, a braking force is generated using the hydraulic pressure booster. In this way, fail-safe protection is ensured.

In the linear control mode, the brake apparatus 20 is able to execute controls other than the control for generating a braking force required by the driver, for example, so-called ABS (Anti-lock Brake System) control for stabilizing the behavior of the vehicle by suppressing slippage of the wheels on a road surface, VSC (Vehicle Stability Control) and TRC (Traction Control). The ABS control is executed to suppress lockup of the tire that is likely to occur when sudden brakes are applied or brakes are applied on a slippery road. The VSC is executed to suppress side skid of the wheel that is likely to occur when the vehicle makes a turn. The TRC is executed to suppress idling of the drive wheel when the vehicle is started or accelerated. The brake assist control for increasing a braking force by supplementing the pedal depression force generated by the driver when sudden brakes are applied may be executed in the linear control mode.

The brake ECU 70 executes, for example, calculations required to execute the ABS control, etc. The brake ECU 70 repeatedly and individually opens and closes the ABS maintaining valves 51 to 54 and the ABS pressure-decreasing valves 56 to 59 at a predetermined duty ratio that is calculated by a known method based on the deceleration of the vehicle, the slip ratio, etc. When the ABS maintaining valves 51 to 54 are open, the brake fluid of which the hydraulic pressure has been regulated by the pressure-increasing linear control valve 66 and the pressure-decreasing linear control valve 67 is supplied to the wheel cylinders 23. The pressure-increasing linear control valve 66 and the pressure-decreasing linear control valve 67 are shared by the wheel cylinders 34, and arranged upstream of the ABS maintaining valves 51 to 54. When the ABS pressure-decreasing valves 56 to 59 are open, the brake fluid in the wheel cylinders 23 is discharged to the reservoir 34. Thus, the brake fluid is supplied to or discharged from the wheel cylinders 23 individually, whereby the braking forces that are applied to the wheels are controlled to suppress slippage of the wheels.

The brake ECU 70 selects one of the brake modes such as the linear control mode, the regulator mode, and the hydro-booster mode based on the signals from the sensors, and executes the control in the selected brake mode. In the linear control mode, the brake ECU 70 executes, for example, the ABS control based on the signals from the sensors on an as-required basis.

When the brake assist control is executed to enhance the degree of brake application of the brakes during a sudden braking operation, the ABS control is sometimes executed along with the brake assist control. The reason why the ABS control is executed is that lockup of the wheel easily occurs because the wheel cylinder pressure is controlled to a relatively high pressure under the brake assist control. The ABS maintaining valves are repeatedly and individually opened and closed under the ABS control, and a volumetric capacity, which is a target of control by the linear control valves, dynamically fluctuates widely. As a result, the control characteristic of the wheel cylinder upstream pressure dynamically fluctuates, which exerts an influence on the controllability. In addition, for example, even when the TRC is executed, the wheel cylinder pressures that are applied to the drive wheels are individually controlled to suppress slippage of the drive wheels. Therefore, the control target volumetric capacity dynamically fluctuates.

When a high wheel cylinder pressure is required and the control target volumetric capacity increases and decreases, it is more difficult to bring the wheel cylinder upstream pressure to a target hydraulic pressure than when the regular braking control is executed. Also, because the outlet of the pressure-decreasing linear control valve 67 is exposed to the atmospheric pressure in the reservoir 34, the upstream pressure may be abruptly decreased when the pressure-decreasing linear control valve 67 is opened. Especially, when the control target volumetric capacity is small, for example, when all the wheel cylinder pressures that are applied to the four wheels are maintained, the upstream pressure is significantly decreased. Such abrupt pressure decrease should be avoided in order to maintain high wheel cylinder pressures.

The pressure-increasing linear control valve 66 may be fully opened in order to maintain high wheel cylinder pressures. However, if the pressure-increasing linear control valve 66 is fully opened, it is not possible to change the wheel cylinder upstream pressure in accordance with the amount of brake operation performed by the driver. In addition, lockup of the wheel may frequently occur, which makes it difficult to achieve the target deceleration. Further, the hydraulic pressure may be confined in the wheel cylinder when the brake operation is cancelled. The pressure-increasing linear control valve 66 may be closed to introduce the regulator pressure into the wheel cylinders. However, the wheel cylinder upstream pressure is usually higher than the regulator pressure during the brake assist control. Therefore, it is not always possible to introduce the hydraulic pressure from the regulator into the wheel cylinders sufficiently quickly. Also, for example, the TRC is usually executed when the brake operation is not performed. Therefore, the regulator pressure corresponds to the atmospheric pressure, and cannot be introduced into the wheel cylinders.

Therefore, according to the embodiment of the invention, the control unit causes a pressure-regulating control valve to function substantially as a differential pressure regulating valve so that the control target hydraulic pressure (for example, maintaining valve upstream pressure) is brought into a permissible range that includes the target hydraulic pressure. That is, in, for example, the pressure-maintaining mode, the pressure-regulating control valve is used as the differential pressure regulating valve. The control unit actively controls the pressure-regulating control valve so that control target hydraulic pressure is brought back into the permissible range if the control target hydraulic pressure largely falls outside the permissible range. As a result, the pressure-regulating control valve is opened and closed like the differential pressure regulating valve before the control mode is switched from the pressure-maintaining mode to, for example, the pressure-decreasing mode in which the pressure-regulating control valve is actively controlled. As a result, fluctuation of the control target hydraulic pressure is moderated. As described above, it is possible to efficiently make up for the fluctuation of the control target hydraulic pressure that falls outside the permissible range by mechanically opening and closing the control valve in addition to executing the electronic control. Especially, when the control characteristic, for example, the control target volumetric capacity dynamically fluctuates, the pressure-regulating control valve is used as the differential pressure control valve. In this way, it is possible to alleviate unfavorable effects of the dynamic fluctuation, thereby bringing the control target hydraulic pressure to the target hydraulic pressure more smoothly.

In this way, the control target hydraulic pressure is basically maintained within or near the permissible range. Therefore, the embodiment of the invention produces favorable effects when the control target hydraulic pressure is controlled to a pressure that is higher than the hydraulic pressure corresponding to the amount of brake operation performed by the driver and the control target volumetric capacity dynamically changes. The embodiment of the invention produces especially favorable effects when the ABS control and the brake assist control are executed at the same time. Also, the embodiment of the invention produces favorable effects when the TRC is executed.

According to the embodiment of the invention, when the deviation of the control target hydraulic pressure from the target hydraulic pressure is equal to or smaller than a first threshold value, if the deviation reaches a second threshold value that is smaller than the first threshold value, the control unit may control the pressure-regulating control valve so that the pressure-regulating control valve is mechanically opened due to the differential pressure. Thus, when the deviation reaches the second threshold value, the control valve is mechanically opened/closed, whereby the deviation is preliminarily reduced. The first threshold value may be set as a value at which the control unit starts the feedback control over the control target hydraulic pressure based on the deviation. The frequency at which the deviation reaches the first threshold value is reduced by preliminarily reducing the deviation due to mechanical opening/closing of the control valve. Therefore, the frequency at which the feedback control over the control valve is executed is reduced. Thus, a control load placed on the control valve is reduced, which improves the controllability.

The control unit may select the pressure-decreasing mode as the pressure-regulating mode when the deviation exceeds the first threshold value, and select the pressure-maintaining mode when the deviation is equal to or smaller than the first threshold value. The control unit may control the pressure for opening the pressure-decreasing control valve in the pressure-maintaining mode so that, for example, the pressure-decreasing control valve is mechanically opened when the deviation exceeds the second threshold value. The control unit may control the pressure-decreasing control valve by executing feedforward control so that the pressure-decreasing control valve is mechanically opened when the deviation reaches the second threshold value. The first and second threshold values may be set in such a manner that the deviation does not actually exceed the first threshold value due to mechanical opening/closing of the pressure-decreasing control valve in the pressure-maintaining mode. Thus, the control mode is not switched from the pressure-maintaining mode to the pressure-decreasing mode. Therefore, it is possible to prevent an abrupt decrease in the wheel cylinder pressure.

Hereinafter, the brake control mode in which the control target volumetric capacity does not change dynamically will be referred to as "regular brake mode", and the brake control mode in which the control target volumetric capacity dynamically changes will be referred to as "special brake mode". The regular brake mode is, for example, the linear control mode in which the wheel cylinder pressures that are applied to the respective four wheels are collectively controlled by the pressure-increasing linear control valve 66 and the pressure-decreasing linear control valve 67. The special brake mode is, for example, the ABS control mode in which the ABS maintaining valves 51 to 54 are repeatedly and individually opened and closed.

Figure 2:
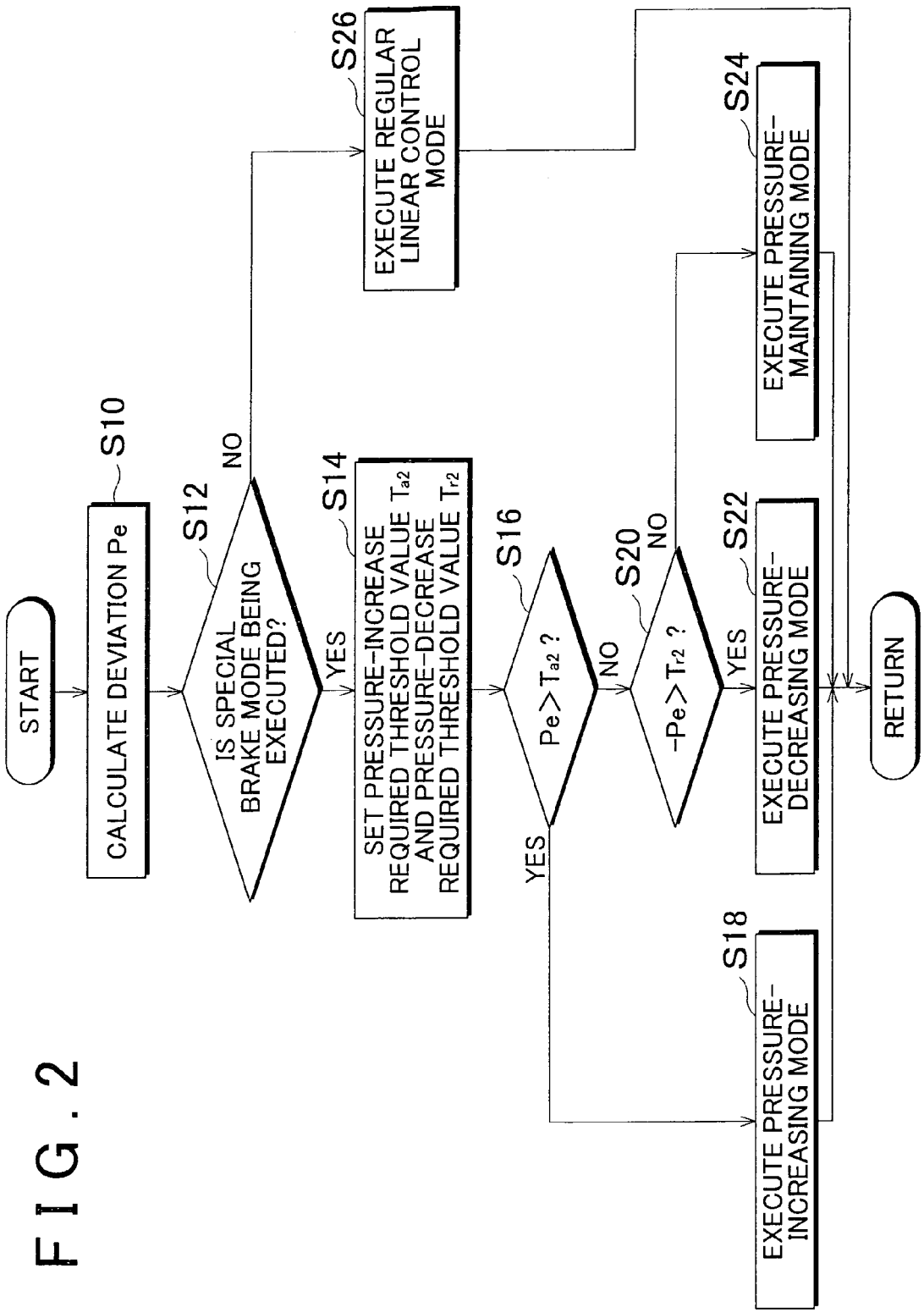
FIG. 2 is a flowchart showing a control routine according to the embodiment of the invention.

FIG. 2 is a flowchart showing a control routine according to a first embodiment of the invention. In the first embodiment of the invention, the brake ECU 70 sets a threshold value at which it is determined that the hydraulic pressure needs to be decreased (hereinafter, referred to as "pressure-decrease required threshold value") to a larger value in the special brake mode than in the normal brake mode so that the control mode is not switched to the pressure-decreasing mode in the special brake mode. In the pressure-maintaining mode, the brake ECU 70 controls the valve opening pressure by supplying an electric current to the pressure-decreasing linear control valve 67 under the feedforward control so that the pressure-decreasing linear control valve 67 is mechanically opened due to the differential pressure when the maintaining valve upstream pressure exceeds the target hydraulic pressure by a reference differential pressure ΔP.

In addition, the brake ECU 70 controls the valve opening pressure by supplying an electric current to the pressure-increasing linear control valve 66 under the feedforward control in the pressure-maintaining mode to deal with a decrease in the hydraulic pressure due to mechanical opening/closing of the pressure-decreasing linear control valve 67. For example, when the maintaining valve upstream pressure falls below the target hydraulic pressure, the valve opening pressure is controlled so that the pressure-increasing linear control valve 66 is mechanically opened by the differential pressure.

The brake ECU 70 periodically executes the control routine shown in FIG. 2 at intervals of, for example, several milliseconds during the linear control mode. First, the brake ECU 70 calculates a deviation Pe (S10). The brake ECU 70 calculates the deviation Pe by subtracting a measured value Pf obtained by the control pressure sensor 73 from a target value Pr of the maintaining valve upstream pressure (Pe=Pr−Pf).

The brake ECU 70 determines whether the special brake mode is being executed (S12). The brake ECU 70 determines whether, for example, the ABS control and the brake assist control are being executed at the same time. Alternatively, the brake ECU 70 determines whether the TRC is being executed. In these cases, the brake ECU 70 may determine that the special brake mode is being executed when at least one of the ABS maintaining valves is repeatedly opened and closed. When two or more ABS maintaining valves are repeatedly opened and closed, the brake ECU 70 may determine that the special brake mode is being executed. When the brake ECU 70 has high computing power, it is considered that there is leeway in the control ability even if the maintaining valves are repeatedly opened and closed. Therefore, when many (for example, two or more) maintaining valves are repeatedly opened and closed, it may be determined that the special brake mode is being executed.

If it is determined that the special brake mode is not being executed ("NO" in S12), the brake ECU 70 executes the regular linear control mode (S26). In the regular linear control mode, the brake ECU 70 sets the threshold value at which it is determined that the hydraulic pressure needs to be increased (hereinafter, referred to as "pressure-increase required threshold value") and the pressure-decrease required threshold value that are used in the regular mode to the pressure-increase required threshold value $T_{a1}$ and the pressure-decrease required threshold value $T_{r1}$, respectively, and selects the control class by executing processes similar to S16 to S24 that will be described below. The control currents that are supplied to the pressure-increasing linear control valve 66 and the pressure-decreasing linear control valve 67 in the pressure-increasing mode and the pressure-decreasing mode are the same regardless of whether the brake mode is the regular brake mode or the special brake mode. In the pressure-maintaining mode, control currents are supplied to neither the pressure-increasing linear control valve 66 nor the pressure-decreasing linear control valve 67 in the regular brake mode. The pressure-increase required threshold value $T_{a1}$ and the pressure-decrease required threshold value $T_{r1}$ are set with the response of the hydraulic pressure to the control that is required in the regular linear control mode taken into account.

On the other hand, if it is determined that the special brake mode is being executed ("YES" in S12), the brake ECU 70 sets the pressure-increase required threshold value $T_{a2}$ and the pressure-decrease required threshold value $T_{r2}$ that are used to switch the control class among the three control classes (S14). Both the pressure-increase required threshold value $T_{a2}$ and the pressure-decrease required threshold value $T_{r2}$ are set to positive values. The pressure-increase required threshold value $T_{a2}$ and the pressure-decrease required threshold value $T_{r2}$ may be set in advance and stored in the brake ECU 70.

The pressure-increase required threshold value $T_{a1}$ in the regular brake mode and the pressure-increase required threshold value $T_{a2}$ in the special brake mode are set to the same value. The pressure-increase required threshold value is empirically set in such a manner that the response required of the control target hydraulic pressure satisfies the specification and the actual hydraulic pressure is promptly increased to the target hydraulic pressure. In contrast, the pressure-decrease required threshold value $T_{r2}$ in the special brake mode is set to a value larger than the pressure-decrease required threshold value $T_{r1}$ in the regular brake mode. The pressure-decrease required threshold value $T_{r2}$ in the special brake mode may be set to a value larger than the pressure-decrease required threshold value $T_{r1}$ in the regular brake mode by, for example, approximately an order of magnitude. Thus, the frequency at which the pressure-decreasing mode is executed in the special brake mode is lower than that in the regular brake mode. Therefore, it is possible to reduce the risk that the hydraulic pressure is excessively decreased during the control in which a high hydraulic pressure is required such as the brake assist control.

The pressure-decrease required threshold value $T_{r2}$ in the special brake mode may be set to a value that is larger than the maximum value of the deviation Pe that is estimated to be reached, for example, when the brake system is operating properly. Thus, as long as the brake system operates properly, the control mode is not switched to the pressure-decreasing mode, and the hydraulic pressure is mechanically decreased as required in the pressure-maintaining mode. On the other hand, if the deviation Pe exceeds the pressure-decrease required threshold value $T_{r2}$ when a malfunction occurs, the control mode is switched to the pressure-decreasing mode to actively decrease the hydraulic pressure, so that the normal state is realized again. The pressure-decrease required threshold value $T_{r2}$ may be set on an as-required basis, by, for example, experiment or simulation with the system characteristic, etc. taken into account.

The brake ECU 70 determines whether the deviation Pe exceeds the pressure-increase required threshold value $T_{a2}$ (S16). If it is determined that the deviation Pe exceeds the pressure-increase required threshold value $T_{a2}$ ("YES" in S16), the brake ECU 70 executes the pressure-increasing mode (S18). In the pressure-increasing mode, the brake ECU 70 supplies a control current to the pressure-increasing linear control valve 66, but does not supply a control current to the pressure-decreasing linear control valve 67. Therefore, the pressure-decreasing linear control valve 67 is closed and the pressure-increasing linear control valve 66 is opened, whereby the maintaining valve upstream pressure is increased. The control current that is supplied to the pressure-increasing linear control valve 66 is the sum of a valve opening current $I_{a0}$ that is determined based on the pressure difference between the inlet and the outlet of the control valve (that is, the pressure difference between the accumulator pressure and the maintaining valve upstream pressure) and the feedback current that is determined based on the deviation Pe. The valve opening current is usually expressed by a linear function that uses the differential pressure as a variable. The feedback current is expressed by, for example, the product of the deviation Pe and a feedback gain Ga. That is, the brake ECU 70 supplies a control current Ia and a control current Ir to the pressure-increasing linear control valve 66 and the pressure-decreasing linear control valve 67, respectively, in the pressure-increasing mode. The control current Ia and the control current Ir are expressed by the following equations.

$$Ia = I_{a0} + Pe \times Ga$$

$$Ir = 0$$

In the pressure-increasing mode, the control current Ir that is supplied to the pressure-decreasing linear control valve 67 is set to zero. Therefore, even if electric power is supplied to the pressure-decreasing linear control valve 67 in the immediately preceding control cycle, supply of an electric current to the pressure-decreasing linear control valve 67 is reliably shut off and the pressure-decreasing linear control valve 67 is closed. Therefore, it is possible to increase the hydraulic pressure using the pressure-increasing linear control valve 66 with the pressure-decreasing linear control valve 67 reliably closed.

If it is determined that the deviation Pe is equal to or smaller than the pressure-increase required threshold value $T_{a2}$ ("NO" in S16), the brake ECU 70 determines whether the deviation −Pe exceeds the pressure-decrease required threshold value $T_{r2}$ (S20). The value that is obtained by assigning a minus mark to the deviation Pe is compared with the pressure-decrease required threshold value $T_{r2}$, just because the pressure-decrease required threshold value $T_{r2}$ is set to a positive value. Note that, the magnitude relationship between the deviation and the threshold value described in this specification means the magnitude relationship between the absolute value of the deviation and the absolute value of the threshold value.

If it is determined that the deviation −Pe exceeds the pressure-decrease required threshold value $T_{r2}$ ("YES" in S20), the brake ECU 70 executes the pressure-decreasing mode (S22). In the pressure-decreasing mode, the brake ECU 70 does not supply a control current to the pressure-increasing linear control valve 66 but supplies a control current to the pressure-decreasing linear control valve 67. Therefore, the pressure-increasing linear control valve 66 is closed and the pressure-decreasing linear control valve 67 is opened, whereby the maintaining valve upstream pressure is decreased. The control current that is supplied to the pressure-decreasing linear control valve 67 is the sum of a valve opening current $I_{r0}$ that is determined based on the pressure difference between the inlet and the outlet of the control valve (that is, the maintaining valve upstream pressure) and a feedback current that is determined based on the deviation Pe. The feedback current is expressed by the product of the deviation Pe and the feedback gain Gr. That is, the brake ECU 70 supplies a control current Ia and a control current Ir to the pressure-increasing linear control valve 66 and the pressure-decreasing linear control valve 67, respectively, in the pressure-decreasing mode. The control current Ia and the control current Ir are expressed by the following equations.

$$Ia=0$$

$$Ir=I_{r0}+Pe \times Gr$$

On the other hand, if it is determined that the deviation −Pe is equal to or smaller than the pressure-decrease required threshold value $T_{r2}$ ("NO" in S20), the brake ECU 70 executes the pressure-maintaining mode (S24). That is, the brake ECU 70 executes the pressure-maintaining mode when the deviation is between the pressure-increase required threshold value and the pressure-decrease required threshold value. In the pressure-maintaining mode, the brake ECU 70 supplies feedforward currents to the pressure-increasing linear control valve 66 and the pressure-decreasing linear control valve 67. In the first embodiment of the invention, the brake ECU 70 controls the control currents that are supplied to the pressure-increasing linear control valve 66 and the pressure-decreasing linear control valve 67 in the pressure-maintaining mode under the feedforward control. The control current Ir that is supplied to the pressure-decreasing linear control valve 67 is controlled in such a manner that the pressure-decreasing linear control valve 67 is mechanically opened when the maintaining valve upstream pressure Pf exceeds the target hydraulic pressure Pr by an amount that is larger than the reference differential pressure ΔP. The control current Ia that is supplied to the pressure-increasing linear control valve 66 is controlled in such a manner that the pressure-increasing linear control valve 66 is mechanically opened when the maintaining valve upstream pressure Pf falls below the target hydraulic pressure Pr.

Figure 3:
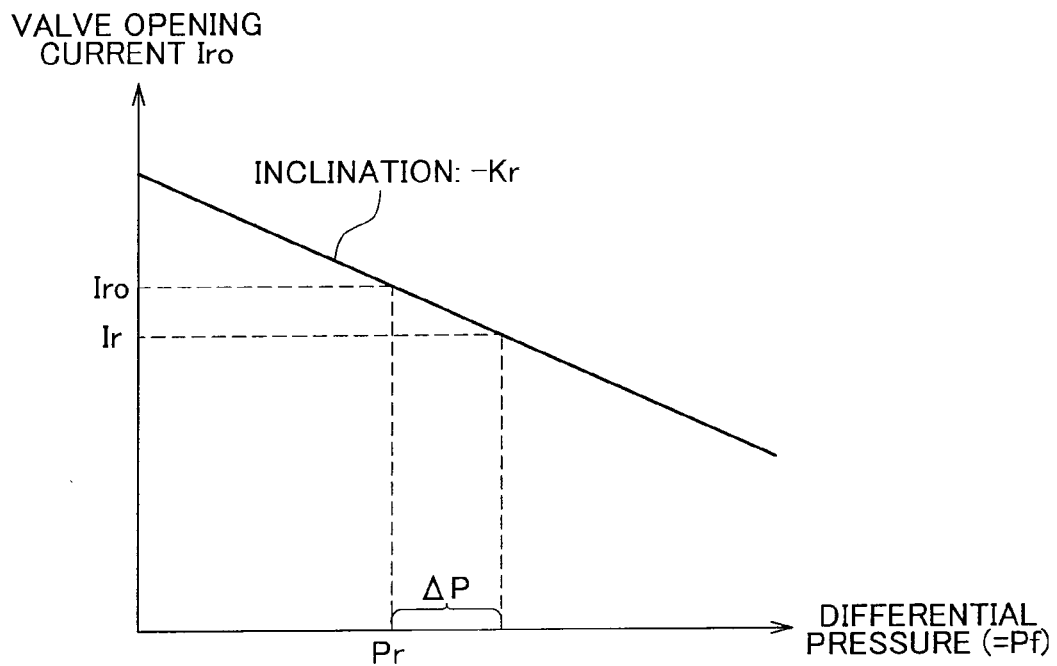
FIG. 3 is a graph showing an example of the relationship between an electric current for opening a pressure-decreasing linear control valve and a differential pressure according to the embodiment of the invention.

FIG. 3 is a graph showing an example of the relationship between the valve opening current $I_{r0}$ that is supplied to the pressure-decreasing linear control valve 67 and the differential pressure. In FIG. 3, the ordinate axis represents the valve opening current $I_{r0}$ and the abscissa axis represents the differential pressure, that is, the maintaining valve upstream pressure Pf. The valve opening current is a control current at which the linear control valve starts opening against the pressure difference between the inlet and the outlet thereof when the control current that is supplied to the linear control valve is increased. The valve opening current $I_{r0}$ is usually expressed by a linear function of the differential pressure Pf. Therefore, the inclination of the linear function is expressed by −Kr (Kr is a positive constant). Thus, the control current Ir that is supplied to the pressure-decreasing linear control valve 67 in the pressure-maintaining mode is expressed by the following equation.

$$Ir=I_{r0}(Pr)-Kr \times \Delta P$$

That is, the control current Ir is a value obtained by subtracting a valve opening current corresponding to the reference differential pressure ΔP from the valve opening current $I_{r0}$ corresponding to the target hydraulic pressure Pr. In other words, the control current Ir is a valve opening current corresponding to the sum of the target hydraulic pressure Pr and the reference differential pressure ΔP. In this case, the reference differential pressure ΔP is set to a value that is smaller than, for example, the pressure-decrease required threshold value $T_{r2}$. Preferably, the reference differential pressure ΔP and the pressure-decrease required threshold value $T_{r2}$ are adjusted in such a manner that the deviation Pe does not exceed the pressure-decrease required threshold value $T_{r2}$ due to mechanical opening/closing of the pressure-decreasing linear control valve 67. Thus, it is possible to eliminate the need to switch the control mode to the pressure regulating mode in which the pressure-decreasing linear control valve 67 is used, that is, the pressure-decreasing mode.

The control current Ir is set to a constant value based on the target hydraulic pressure Pr, if the linear function that expresses the valve opening current and the reference differential pressure ΔP are provided. The linear function is obtained in advance and stored in the brake ECU 70. The reference differential pressure ΔP is set in advance and stored in the brake ECU 70. The reference differential pressure ΔP may be set to a constant value independently of the value of the target hydraulic pressure Pr, or may be set so as to vary in accordance with the target hydraulic pressure Pr, for example, set to a value that corresponds to a certain percentage of the target hydraulic pressure Pr. In this way, the brake ECU 70 controls the control current Ir under the feedforward control. It is possible to set the control current Ia that is supplied to the pressure-increasing linear control valve 66 in the manner similar to the manner in which the control current Ir that is supplied to the pressure-decreasing linear control valve 67 is set.

Figure 4:
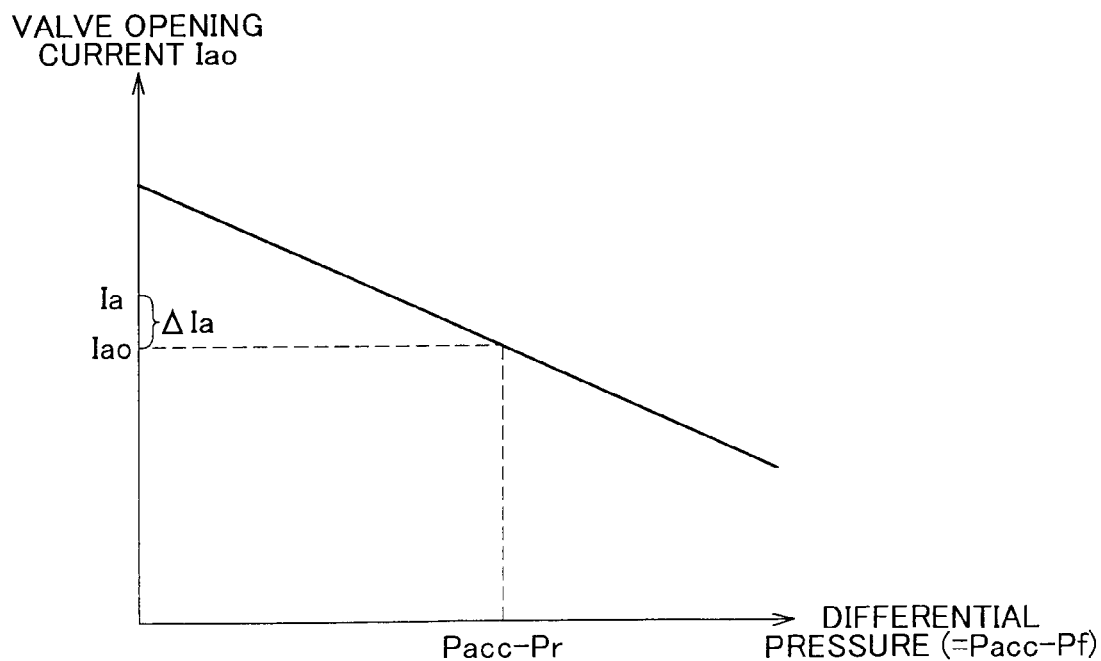
FIG. 4 is a graph showing an example of the relationship between an electric current for opening a pressure-increasing linear control valve and a differential pressure according to the embodiment of the invention.

FIG. 4 is a graph showing an example of the relationship between the valve opening current $I_{a0}$ that is supplied to the pressure-increasing linear control valve 66 and the differential pressure. In FIG. 4, the ordinate axis represents the valve opening current $I_{a0}$, and the abscissa axis represents the pressure difference between the inlet and the outlet, that is, the pressure difference between the accumulator pressure $P_{acc}$ and the maintaining valve upstream pressure Pf. The valve opening current that is supplied to the pressure-increasing linear control valve 66 is expressed by a linear function of the differential pressure as in the case of the pressure-decreasing linear control valve 67 shown in FIG. 3.

In the first embodiment of the invention, the control current Ia that is supplied to the pressure-increasing linear control valve 66 is expressed by a value that is obtained by adding a correction amount ΔIa to the valve opening current $I_{a0}$ corresponding to the target hydraulic pressure Pr.

$$Ia=I_{a0}(P_{acc}-Pr)+\Delta Ia$$

The correction amount ΔIa may be omitted. However, because the linear function that expresses the valve opening current Ia contains an error, the correction amount ΔIa may be added to the valve opening current $I_{a0}$ so that the pressure-increasing linear control valve 66 is opened more easily. The valve opening current Ia is slightly increased by adding the correction amount ΔIa to the valve opening current $I_{a0}$ on an as-required basis, and the pressure-increasing linear control valve 66 is mechanically opened before the control target hydraulic pressure Pf falls below the target hydraulic pressure Pr. As a result, it is possible to maintain the control target hydraulic pressure Pf at a high value. Therefore, especially when the brake assist control is being executed, it is preferable to add the correction amount ΔIa to the valve opening current $I_{a0}$. It is possible to set the control current Ir that is supplied to the pressure-decreasing linear control valve 67 in the manner similar to the manner in which the control current Ia that is supplied to the pressure-increasing linear control valve 66 is set.

According to the first embodiment of the invention described above, the feedforward currents are supplied to the linear control valves so that the pressure-increasing linear control valve 66 is mechanically opened when the maintaining valve upstream pressure Pf falls below the target hydraulic pressure Pr in the pressure-maintaining mode, and the pressure-decreasing linear control valve 67 is mechanically opened when the maintaining valve upstream pressure Pf exceeds the target hydraulic pressure Pr by an amount that is larger than the reference differential pressure ΔP. As a result, the maintaining valve upstream pressure Pf is brought into the permissible range. The lower limit of the permissible range corresponds to the target hydraulic pressure Pr, and the width of the permissible range corresponds to the reference differential pressure ΔP.

The permissible range is set so as to be included in the setting range that is determined based on the pressure-increasing threshold value and the pressure-decreasing threshold value. Therefore, the linear control valve is mechanically opened/closed like the differential pressure regulating valve before the control mode is switched from the pressure-maintaining mode to the pressure-increasing mode or the pressure-decreasing mode, and the deviation Pe is reduced. Thus, it is possible to produce the effect of compensating for a delay in response to the control that may be caused due to the measurement of the hydraulic pressure and switching of the control class. Also, it is possible to reduce the frequency at which the control mode is switched to the pressure-increasing mode or the pressure-decreasing mode by appropriately setting the setting range and the permissible range. In the first embodiment of the invention, the frequency at which the pressure-decreasing mode is executed becomes substantially zero in the special brake mode. Thus, it is possible to suppress occurrence of unnecessary pressure decrease such as excessive pressure decrease due to dynamic fluctuation in the control target volumetric capacity. This is especially favorable when the brake assist control and the ABS control are executed at the same time.

In the first embodiment of the invention, the control current is supplied to the pressure-increasing linear control valve 66 in both the pressure-increasing mode and the pressure-maintaining mode. Therefore, the control current is brought to the target value smoothly when the control mode is switched between the pressure-increasing mode and the pressure-maintaining mode. Especially when the control mode is switched from the pressure-increasing mode to the pressure-maintaining mode, the control current is decreased to the valve opening current from the sum of the valve opening current and the feedback current. This means that a valve element and a valve seat of the pressure-increasing linear control valve 66 contact each other slowly. Therefore, the service life of the control valve is prolonged.

Next, a second embodiment of the invention will be described. The second embodiment of the invention differs from the first embodiment of the invention in the control current in the pressure-decreasing mode and the pressure-maintaining mode in the special brake mode. According to the first embodiment of the invention, the hydraulic pressure is brought into the permissible range by mechanically opening/closing the pressure-decreasing control valve in the pressure-maintaining mode without actually using the pressure-decreasing mode in the special brake mode. In contrast, according to the second embodiment of the invention, the pressure-decreasing mode is executed on an as-required basis even in the special brake mode to take measures against overshoot when the hydraulic pressure is increased. The features that are common between the first embodiment and the second embodiment will not be described below.

The control routine according to the second embodiment of the invention is different from the control routine according to the first embodiment of the invention in FIG. 2, only in setting of the pressure-decrease required threshold value $T_{r2}$ in the special brake mode, the control current that is supplied to the pressure-increasing linear control valve 66 in the pressure-decreasing mode, and the control current that is supplied to the pressure-decreasing linear control valve 67 in the pressure-maintaining mode.

The pressure-decrease required threshold value $T_{r2}$ is set to a value larger than the pressure-decrease required threshold value $T_{r1}$ in the regular brake mode as in the first embodiment of the invention, but need not be set to a value as large as that in the first embodiment of the invention. In the second embodiment of the invention, the pressure-decrease required threshold value $T_{r2}$ is set as an overshoot permissible amount for the target hydraulic pressure Pr. Thus, if the control target hydraulic pressure Pf is increased by an amount that is larger than the set overshoot permissible amount, the control target hydraulic pressure Pf is smoothly decreased toward the target pressure in the pressure-decreasing mode.

In the pressure-decreasing mode, the brake ECU 70 supplies a valve-opening electric current corresponding to the target hydraulic pressure Pr to the pressure-increasing linear control valve 66 as the control current. Thus, even if the hydraulic pressure is excessively decreased in the pressure-decreasing mode, the pressure-increasing linear control valve 66 is mechanically opened when the hydraulic pressure Pf falls below the target hydraulic pressure Pr. In this way, it is possible to suppress unnecessary pressure decrease such as a pressure decrease to a value below the target hydraulic pressure Pr. As in the first embodiment of the invention, the correction amount ΔIa may be added to the control current that is supplied to the pressure-increasing linear control valve 66.

The pressure-decreasing mode is executed at a higher frequency in the second embodiment of the invention than in the first embodiment of the invention. Therefore, the brake ECU 70 does not supply a control current to the pressure-decreasing linear control valve 67 in the pressure-maintaining mode. As in the first embodiment of the invention, a valve opening current corresponding to the target hydraulic pressure Pr is supplied to the pressure-increasing linear control valve 66 as the control current.

As described above, according to the second embodiment of the invention as well, it is possible to achieve the target hydraulic pressure more reliably by using the linear control valve as the differential pressure regulating valve.

In the second embodiment of the invention, a control current is supplied to the pressure-increasing linear control valve 66 in each of all the three control classes. Therefore, it is possible to reduce a delay in response of the control current to the control that is likely to occur when the control class is switched. Because the valve element and the valve seat of the pressure-increasing linear control valve 66 contact each other slowly, the service life of the control valve is prolonged.

In each embodiment of the invention, the feedback gain Ga in the pressure-increasing mode may vary depending on the control target volumetric capacity, that is, the number of the ABS maintaining valves that are open in the control cycle. More specifically, the brake ECU 70 increases the control gain for the pressure-increasing linear control valve 66 when the control target volumetric capacity increases based on the open/closed states of the ABS maintaining valves 51 to 54, whereas the brake ECU 70 decreases the control gain when the control target volumetric capacity decreases. As described above, it is possible to enhance the controllability by changing the control gain in accordance with the control target volumetric capacity.

In the embodiment of the invention, the control gain may be set to different values for the respective open/closed states of the ABS maintaining valves 51 to 54 described below. The open/closed states include the state in which all the ABS maintaining valves 51 to 54 are closed, the state in which one of the ABS maintaining valves 51 to 54 is open, the state in which two of the ABS maintaining valves 51 to 54 are open, the state in which three of the ABS maintaining valves 51 to 54 are open, and the state in which all the ABS maintaining valves 51 to 54 are open. More specifically, the state in which one of the ABS maintaining valves 51 to 54 is open is classified into the state in which only one of the ABS maintaining valves 51 and 52 for the front wheels is open and the state in which only one of the ABS maintaining valves 53 and 54 for the rear wheels is open. The state in which two of the ABS maintaining valves 51 to 54 are open is classified into the state in which both the ABS maintaining valves 51 and 52 for the front wheels are open, the state in which both the ABS maintaining valves 53 and 54 for the rear wheels are open, and the state in which one of the ABS maintaining valves 51 and 52 for the front wheels is open and one of the ABS maintaining valves 53 and 54 for the rear wheels is open. The state in which three of the ABS maintaining valves 51 to 54 are open is classified into the state in which both the ABS maintaining valves 51 and 52 for the front wheels are open and one of the ABS maintaining valves 53 and 54 for the rear wheels is open and the state in which one of the ABS maintaining valves 51 and 52 for the front wheels is open and both the ABS maintaining valves 53 and 54 for the rear wheels are open.

Opening of the ABS maintaining valves 51 and 52 for the front wheels and opening of the ABS maintaining valves 53 and 54 for the rear wheels are distinguished from each other, because the volumetric capacity of each of the wheel cylinders 23FR and 23FL for the front wheels is usually different from the volumetric capacity of each of the wheels cylinders 23RR and 23RL for the rear wheels. Therefore, although the number of open valves is two in both the state in which the ABS maintaining valves 51 and 52 for the front wheels are open and the state in which ABS maintaining valves 53 and 54 for the rear wheels are open, the control target volumetric capacity differs between these states.

In the second embodiment of the invention, the control gain is set to different values that correspond to the above-described nine open/closed states, and stored in the brake ECU 70. A typical example will be described below. When the total volumetric capacity of the right and left wheel cylinders 23RR and 23RL for the rear wheels corresponds to the volumetric capacity of one of the wheel cylinders for the front wheels, six types of control gains in total may be set in proportion to the control target volumetric capacity. In this way, the number of constants that need to be stored in the brake ECU 70 is reduced. The control gain may be set with the relationship between the control target volumetric capacity and the wheel cylinder pressure in each open/closed state taken into account. The value of the control gain may be set so as to be proportional to the control target volumetric capacity. In this case, the control gain may be adjusted on an as-required basis so as to ensure sufficient controllability.

Two types of control gains may be set for the state in which all the ABS maintaining valves 51 to 54 are closed. Because the control target volumetric capacity when all the ABS maintaining valves 51 to 54 are closed is limited to the volumetric capacity of the passages such as the main passage 45, the control target volumetric capacity is considerably small. Therefore, when the deviation Pe is within the predetermined range, the control gain may be set to zero to maintain the hydraulic pressure. On the other hand, when the deviation Pe is outside the predetermined range, the control gain may be set to a predetermined value. In this case, the control gain may be immediately set to zero if it is determined that all the ABS maintaining valves 51 to 54 are closed. In this way, it is possible to suppress overshoot due to a delay in response to the control due to measurement of the hydraulic pressure. If it is determined that all the ABS maintaining valves 51 to 54 are continuously closed and the deviation Pe is outside the predetermined range after the control gain is set to zero, the control gain may be set to a predetermined value. In this way, it is possible to leave room to bring the control target hydraulic pressure to the target value when the deviation is large. However, the magnitude of the control gain when the deviation Pe is outside the predetermined range is made proportional to the control target volumetric capacity, and is set to a value that is considerably lower than that when only one of the ABS maintaining valves 51 to 54 is open.

In the pressure-decreasing mode, the feedback gain Gr in the regular brake mode is set to a value lower than that in the special brake mode. In this way, even when the control mode is switched to the pressure-decreasing mode in the special brake mode, the pressure is decreased relatively moderately.

As the wheel cylinder pressure decreases, the control gain may be set to a larger value. This is because the rate of increase in the hydraulic pressure with respect to the amount of hydraulic fluid flowing into the wheel cylinders 23 is smaller when the wheel cylinder pressure is relatively low than when the wheel cylinder pressure is relatively high. The control gain may be set so as to continuously change in accordance with the wheel cylinder pressure. Alternatively, the control gain may be set discretely in such a manner that one control gain is assigned to a predetermined hydraulic pressure range.

The invention claimed is:

1. A brake apparatus, comprising:
   multiple wheel cylinders that apply braking forces to respective multiple wheels when being supplied with hydraulic fluid;
   multiple maintaining valves that are arranged upstream of the respective wheel cylinders in order to maintain hydraulic pressures in the respective wheel cylinders;
   pressure-regulating control valves that are arranged upstream of the multiple maintaining valves in order to control an upstream pressure which is a pressure upstream of the multiple maintaining valve, the pressure-regulating valves including a pressure-increasing linear control valve and a pressure-decreasing linear control valve; and
   a control unit that:
      calculates a deviation of the upstream pressure between a target upstream pressure and a measured upstream pressure,
      controls the braking forces by selecting one of multiple brake modes that include a regular brake mode in which all the maintaining valves are kept open so that the upstream pressure is supplied to the wheel cylinders and a special brake mode in which at least one of the maintaining valves is repeatedly opened and closed, controls the upstream pressure by switching a pressure-control mode to a pressure-regulating mode which is selected when the deviation of the upstream pressure is outside a setting range and in which the upstream pressure is brought to the target pressure by opening one of the pressure-increasing linear control valve or the pressure-decreasing linear control valve and closing the other of the pressure-increasing linear control valve or the pressure-decreasing linear control valve, and when the special brake mode is selected, controls the upstream pressure by switching to a pressure-maintaining mode that is selected when the deviation of the upstream pressure is within the setting range, wherein the control unit controls a valve opening pressure for opening the one of the pressure-increasing linear control valve or the pressure-decreasing linear control valve in the pressure-maintaining mode so that the one of the pressure-increasing linear control valve or the pressure-decreasing linear control valve is opened due to a differential pressure across the one of the pressure-regulating control valves before the pressure-control mode is switched from the pressure-maintaining mode to the pressure-regulating mode;

wherein the control unit determines the setting range based on whether the pressure-regulating mode is a pressure-increase mode or a pressure-decrease mode, and wherein an upper limit of the setting range is a pressure-increase required threshold value and a lower limit of the setting range is a pressure-decrease required threshold value, the upper limit of the setting range for the pressure-increase mode in the regular brake mode being the same as the upper limit of the setting range for the pressure-increase mode in the special brake mode, and the lower limit of the setting range for the pressure-decrease mode in the regular brake mode being less than the lower limit of the setting range for the pressure-decrease mode in the special brake mode.

2. The brake apparatus according to claim 1, wherein when the special brake mode is selected, the valve opening pressure is controlled in the pressure-maintaining mode in such a manner that the opened one of the pressure-increasing linear control valve or the pressure-decreasing linear control valve is opened when the upstream pressure is not within a permissible range that is included in the setting range and that includes the target pressure.

3. The brake apparatus according to claim 2, wherein:
the pressure-increasing linear control valve is used to increase the upstream pressure and the pressure-decreasing linear control valve is used to decrease the upstream pressure; and
the control unit controls the valve opening pressure for opening the pressure-increasing linear control valve and the valve opening pressure for opening the pressure-decreasing linear control valve in such a manner that the pressure-increasing linear control valve is opened when the upstream pressure falls below the target pressure and the pressure-decreasing linear control valve is opened when the upstream pressure exceeds a reference pressure that is set to a value which is higher than the target pressure by a predetermined amount.

4. The brake apparatus according to claim 3, wherein:
the pressure-decreasing linear control valve is an electromagnetically-controlled valve of which the valve opening pressure fluctuates in accordance with an electric current that is supplied to the pressure-decreasing linear control valve;
the pressure-increasing linear control valve is an electromagnetically-controlled valve of which the valve opening pressure fluctuates in accordance with an electric current that is supplied to the pressure-increasing linear control valve; and
the control unit controls the valve opening pressure for opening the pressure-decreasing linear control valve by executing feedforward control over the electric current that is supplied to the pressure-decreasing linear control valve, or the valve opening pressure for opening the pressure-increasing linear control valve by executing feedforward control over the electric current that is supplied to the pressure-increasing linear control valve.

5. The brake apparatus according to claim 1, wherein:
the control unit controls the valve opening pressure for opening the pressure-increasing linear control valve in such a manner that the pressure-increasing linear control valve is opened when the upstream pressure falls below the target pressure in the pressure-regulating mode.

6. A brake apparatus, comprising:
multiple wheel cylinders that apply braking forces to respective multiple wheels when being supplied with hydraulic fluid;
multiple maintaining valves that are arranged upstream of the respective wheel cylinders in order to maintain hydraulic pressures in the respective wheel cylinders;
pressure-regulating control valves that are arranged upstream of the multiple maintaining valves in order to control an upstream pressure which is a pressure upstream of the multiple maintaining valves, the pressure-regulating valves including a pressure-increasing linear control valve and a pressure-decreasing linear control valve; and
a control unit that:
calculates a deviation of the upstream pressure between a target upstream pressure and a measured upstream pressure,
controls the braking forces by selecting one of multiple brake modes that include a regular brake mode in which all the maintaining valves are kept open so that the upstream pressure is supplied to the wheel cylinders and a special brake mode in which at least one of the maintaining valves is repeatedly opened and closed,
controls the upstream pressure by switching a pressure-control mode to a pressure-regulating mode which is selected when the deviation of the upstream pressure is outside a setting range and in which the upstream pressure is controlled by opening one of the pressure-increasing linear control valve or the pressure-decreasing linear control valve and closing the other of the pressure-increasing linear control valve or the pressure-decreasing linear control valve, and
when the special brake mode is selected, controls the upstream pressure by switching to a pressure-maintaining mode that is selected when the deviation of the upstream pressure is within the setting range,
wherein the control unit opens one of the pressure-increasing linear control valve or the pressure-decreasing linear control valve before the pressure-control mode is switched from the pressure-maintaining mode to the pressure-regulating mode, wherein the control unit determines the setting range based on whether the pressure-regulating mode is a pressure-increase mode or a pressure-decrease mode, and wherein an upper limit of the setting range is a pressure-increase required threshold value and a lower limit of the setting range is a pressure-decrease required threshold value, the upper limit of the setting range for the pressure-increase mode in the regular brake mode being the same as the upper limit of the setting range for the pressure-increase mode in the special brake mode, and the lower limit of the setting range for the pressure-decrease mode in the regular brake mode being less than the lower limit of the setting range for the pressure-decrease mode in the special brake mode.

7. The brake apparatus according to claim 6, wherein when the special brake mode is selected, the control unit opens one of the pressure-increasing linear control valve or the pressure-decreasing linear control valve when the upstream pressure is not within a permissible range that is included in the setting range and that includes the target pressure.

8. The brake apparatus according to claim 7, wherein:
the pressure-increasing linear control valve is used to increase the upstream pressure and the pressure-decreasing linear control valve is used to decrease the upstream pressure; and
the control unit opens the pressure-increasing linear control valve when the upstream pressure falls below the target pressure, and opens the pressure-decreasing linear control valve when the upstream pressure exceeds a reference pressure that is set to a value which is higher than the target pressure by a predetermined amount.

9. The brake apparatus according to claim 8, wherein:
the pressure-decreasing linear control valve is an electromagnetically-controlled valve of which the valve opening pressure fluctuates in accordance with an electric current that is supplied to the pressure-decreasing linear control valve;
the pressure-increasing linear control valve is an electromagnetically-controlled valve of which the valve opening pressure fluctuates in accordance with an electric current that is supplied to the pressure-increasing linear control valve; and
the control unit opens the pressure-decreasing linear control valve by executing feedforward control over the electric current that is supplied to the pressure-decreasing linear control valve, or opens the pressure-increasing linear control valve by executing feedforward control over the electric current that is supplied to the pressure-increasing linear control valve.

10. The brake apparatus according to claim 6, wherein the control unit opens the pressure-increasing linear control valve when the upstream pressure falls below the target pressure in the pressure-regulating mode.

11. A method for controlling a brake apparatus which includes multiple wheel cylinders that apply braking forces to respective multiple wheels when being supplied with hydraulic fluid; multiple maintaining valves that are arranged upstream of the respective wheel cylinders in order to maintain hydraulic pressures in the respective wheel cylinders; and pressure-regulating control valves, including a pressure-increasing linear control valve and a pressure-decreasing linear control valve, that are arranged upstream of the multiple maintaining valves in order to control an upstream pressure which is a pressure upstream of the multiple maintaining valves, the method comprising:

calculating a deviation of the upstream pressure between a target upstream pressure and a measured upstream pressure;

selecting one of multiple brake modes that include a regular brake mode in which all the maintaining valves are kept open so that the upstream pressure is supplied to the wheel cylinders and a special brake mode in which at least one of the maintaining valves is repeatedly opened and closed;

selecting a pressure-regulating mode in which the upstream pressure is controlled by opening one of the pressure-increasing linear control valve or the pressure-decreasing linear control valve and closing the other of the pressure-increasing linear control valve or the pressure-decreasing linear control valve, when the deviation of the upstream pressure is outside a setting range;

selecting a pressure-maintaining mode when the special brake mode is selected and the deviation is within the setting range; and opening one of the pressure-increasing linear control valve or the pressure-decreasing linear control valve before the pressure-control mode is switched from the pressure-maintaining mode to the pressure-regulating mode, wherein the setting range is determined based on whether the pressure-regulating mode is a pressure-increase mode or a pressure-decrease mode, and wherein an upper limit of the setting range is a pressure-increase required threshold value and a lower limit of the setting range is a pressure-decrease required threshold value, the upper limit of the setting range for the pressure-increase mode in the regular brake mode being the same as the upper limit of the setting range for the pressure-increase mode in the special brake mode, and the lower limit of the setting range for the pressure-decrease mode in the regular brake mode being less than the lower limit of the setting range for the pressure-decrease mode in the special brake mode.

12. The method according to claim 11, wherein:
when the special brake mode is selected, one of the pressure-increasing linear control valve or the pressure-decreasing linear control valve is opened when the upstream pressure is not within a permissible range that is included in the setting range and that includes the target pressure.

13. The method according to claim 12, wherein
the pressure-increasing linear control valve is used to increase the upstream pressure and the pressure-decreasing linear control valve is used to decrease the upstream pressure;
the pressure-increasing linear control valve is opened when the upstream pressure falls below the target pressure; and
the pressure-decreasing linear control valve is opened when the upstream pressure exceeds a reference pressure that is set to a value which is higher than the target pressure by a predetermined amount.

14. The method according to claim 13, wherein
the pressure-decreasing linear control valve is an electromagnetically-controlled valve of which the valve opening pressure fluctuates in accordance with an electric current that is supplied to the pressure-decreasing linear control valve;

the pressure-increasing linear control valve is an electromagnetically-controlled valve of which the valve opening pressure fluctuates in accordance with an electric current that is supplied to the pressure-increasing linear control valve; and feedforward control is executed over the electric current that is supplied to the pressure-decreasing linear control valve so that the pressure-decreasing linear control valve is opened, or feedforward control is executed over the electric current that is supplied to the pressure-increasing linear control valve so that the pressure-increasing linear control valve is opened.

15. The method according to claim 11, wherein the pressure-increasing linear control valve is opened when the upstream pressure falls below the target pressure in the pressure-regulating mode.

* * * * *